(12) United States Patent
Nankandiyil et al.

(10) Patent No.: US 10,708,739 B2
(45) Date of Patent: *Jul. 7, 2020

(54) SELECTIVELY TRANSFERRING ONE OR MORE SERVICES IN MULTI-SUBSCRIBER IDENTITY MODULE (SIM)-MULTI-STANDBY ELECTRONIC DEVICE

(71) Applicant: Samsung Electronics Co., Ltd., Suwon-si, Gyeonggi-do (KR)

(72) Inventors: Shyjumon Nankandiyil, Noida (IN); Anand Asati, Noida (IN); Gurmanjeet Singh Sidhu, Noida (IN); Inderjeet Singh Bedi, Noida (IN); Samrat Bhasin, Noida (IN); Gaurav Goel, Noida (IN); Amod Ashokchourasia, Noida (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/436,107

(22) Filed: Jun. 10, 2019

(65) Prior Publication Data

US 2019/0297477 A1  Sep. 26, 2019

Related U.S. Application Data

(63) Continuation of application No. 15/955,300, filed on Apr. 17, 2018, now Pat. No. 10,321,289.

(30) Foreign Application Priority Data

Apr. 18, 2017  (IN) ............................. 201711013731
Nov. 24, 2017  (IN) ............................. 201711013731

(51) Int. Cl.
*H04W 4/20* (2018.01)
*H04W 4/60* (2018.01)
(Continued)

(52) U.S. Cl.
CPC ......... *H04W 4/60* (2018.02); *H04M 1/72522* (2013.01); *H04W 4/06* (2013.01);
(Continued)

(58) Field of Classification Search
CPC ..................................................... H04W 4/60
See application file for complete search history.

(56) References Cited

U.S. PATENT DOCUMENTS

| 8,983,441 B2 | 3/2015 | Baek |
| 2008/0064443 A1 | 3/2008 | Shin et al. |

(Continued)

FOREIGN PATENT DOCUMENTS

| KR | 10-0793093 B1 | 1/2008 |
| KR | 10-2014-0080099 A | 6/2014 |

(Continued)

*Primary Examiner* — Michael T Vu
(74) *Attorney, Agent, or Firm* — Jefferson IP Law, LLP

(57) ABSTRACT

A method for transferring at least one service in a device and device thereof are provided. The method includes detecting invoking of an application on the electronic device, in response to the detection, providing access of a radio frequency (RF) transceiver of the device to a first subscriber identity module (SIM), the first SIM being in an active data session, and enabling transfer of at least one service associated with at least one second SIM to the first SIM.

16 Claims, 8 Drawing Sheets

(51) Int. Cl.
*H04M 1/725*    (2006.01)
*H04W 48/18*    (2009.01)
*H04W 4/06*     (2009.01)
*H04W 60/00*    (2009.01)

(52) U.S. Cl.
CPC ............ *H04W 4/20* (2013.01); *H04W 48/18* (2013.01); *H04W 60/005* (2013.01)

(56) References Cited

U.S. PATENT DOCUMENTS

| | | | |
|---|---|---|---|
| 2011/0087990 A1* | 4/2011 | Ng | G06F 3/04886 715/773 |
| 2012/0135715 A1 | 5/2012 | Kang et al. | |
| 2013/0005394 A1* | 1/2013 | Geary | H04W 52/028 455/552.1 |
| 2013/0148574 A1 | 6/2013 | Liu et al. | |
| 2014/0179373 A1 | 6/2014 | Hur et al. | |
| 2014/0273974 A1 | 9/2014 | Varghese et al. | |
| 2014/0274006 A1 | 9/2014 | Mutya et al. | |
| 2015/0031408 A1 | 1/2015 | Kalla et al. | |
| 2016/0014579 A1* | 1/2016 | Kasilya Sudarsan | H04W 4/16 455/417 |
| 2016/0021660 A1 | 1/2016 | Krishnamurthy | |
| 2016/0174195 A1 | 6/2016 | Lee et al. | |
| 2016/0337826 A1 | 11/2016 | Baek | |

FOREIGN PATENT DOCUMENTS

| | | |
|---|---|---|
| KR | 10-1443801 B1 | 9/2014 |
| KR | 10-2015-0131236 A | 11/2015 |

\* cited by examiner

SELECTIVELY TRANSFERRING ONE OR MORE SERVICES IN MULTI-SUBSCRIBER IDENTITY MODULE (SIM)-MULTI-STANDBY ELECTRONIC DEVICE

CROSS-REFERENCE TO RELATED APPLICATION(S)

This application is a continuation application of prior application Ser. No. 15/955,300, filed on Apr. 17, 2018, which was based on and claimed priority under 35 U.S.C. § 119(a) of an Indian provisional patent application number 201711013731, filed on Apr. 18, 2017, and of an Indian complete patent application Serial number 201711013731, filed on Nov. 24, 2017, in the Indian Intellectual Property Office, the disclosure of each of which is incorporated by reference herein in its entirety.

TECHNICAL FIELD

The disclosure relates to multi-subscriber identity module (SIM)-multi-standby electronic device. More particularly, the disclosure relates to selectively transferring one or more services in multi-SIM-multi-standby electronic device.

BACKGROUND

With growing popularity of cellular devices, such as smart phones, tablets, and note pads, users now desire having different contact numbers for different usages, such as personal usage and business usage. To cater to such desire, current cellular devices have now evolved to support dual or multi subscriber identity module (SIM). Further, current cellular devices are having capability of streaming high-quality content, such as streaming videos. As such, demand for high speed, high capacity, and low cost mobile broadband Internet while saving bandwidth has greatly increased. To cater to such demands, new technologies, such as long-term evolution (LTE) are being developed. Evolved multimedia broadcast multicast services (eMBMS), also referred to as LTE Broadcast, enables the transmission of same content, such as multimedia streaming and sending operating system (OS) update, to a large number of users located in an eMBMS service area at the same time.

However, presently a large number of dual or multi SIM cellular devices available in the market operate on dual-standby or multi-standby mode, i.e., while a particular SIM is in use, the other SIM(s) becomes inactive or not reachable. As such, if the eMBMS is used by the user on a particular SIM with any operator, the other SIM(s) becomes inactive or not reachable. Similarly, when using applications that consume high bandwidth, such as video streaming application, data downloading application, and financial applications on a data session provided by particular SIM, in one scenario, the other SIM(s) becomes inactive or not reachable. In other scenario, incoming call on other SIM(s) interrupts the data session on the particular SIM. Various solutions are available that overcome this problem. One solution to overcome this problem is to modify the hardware component, i.e., chipset with a tune away feature. However, this solution is burdensome and expensive for retrofitting existing cellular devices.

In another solution, a user-based call waiting function and call forwarding function is adjusted to a dual SIM phone environment. Accordingly, a menu including one or more options to set a dual SIM function to forward a first incoming call from the first phone number to the second phone number, and vice versa is provided on the cell phone. This provides dynamic call forwarding feature with user intervention for all the preconfigured call functionalities. However, this solution only caters to call forwarding.

In another solution, a dual SIM mobile terminal may include a controller which is a single chipset, a dual SIM, and two radio frequency (RF) units, thereby having an effect capable of providing a service at the same level as a dual SIM using two mobile terminals even with one mobile terminal. Furthermore, dual SIM switching is performed at run time according to a state of the network, a pricing system, and a user's setting, thereby providing the user's desired service. However, this solution is directed towards SIM switching based on certain parameters.

In another solution, a user-equipment determines a timing of each of one or more audio transmissions of one or more audio segments through multimedia broadcast multicast service (MBMS) streaming via a first radio access technology (RAT), where the MBMS streaming includes the one or more audio segments and one or more video segments. The user-equipment refrains from tuning away from the first RAT to a second RAT during at least one audio transmission of the one or more audio transmissions, the second RAT being different than the first RAT. This solution ensures EMBMS quality and however other SIM still becomes unreachable.

In another solution, network conditions may be monitored for signal quality during an active call. When signal quality on the network deteriorates, the multi-SIM wireless device may switch the active call to a network associated with a different SIM that provides better service. To enable the switch, the multi-SIM wireless device may setup a conference call with the called party and the different SIM. In the various embodiments, the multi-SIM wireless devices may be a dual-SIM dual active (DSDA) wireless device. However, this solution is directed towards SIM switching when signal quality deteriorates.

Therefore, a need exists for an apparatus and method for selectively transferring one or more services in multi-subscriber identity module (SIM)-multi-standby electronic device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for selectively transferring one or more services in multi-subscriber identity module (SIM)-multi-standby electronic device.

In accordance with an aspect of the disclosure, the disclosure as embodied and broadly described herein, describes a method for transferring at least one service in a device, the method comprising detecting invoking of an application on the device, in response to the detection, providing access of a radio frequency (RF) transceiver of the device to a first subscriber identity module (SIM), the first SIM being in an active data session, and enabling transfer of at least one service associated with at least one second SIM to the first SIM.

In accordance with another aspect of the disclosure, the disclosure as embodied and broadly described herein, describes a device for transferring at least one service, the device comprising: a processor configured to detect invoking of an application on the device, provide complete access of a radio frequency (RF) transceiver of the electronic device to a first SIM in response to the detection, the first SIM being in an active data session, and enable transfer of at least one service associated with at least one second SIM to the first SIM, and the RF transceiver to transfer the at least one service.

The advantages of the disclosure include, but not limited to, enabling RF functionalities on all SIMs simultaneously while using the selected applications, specifically eMBMS. This greatly enhances user-experience. In addition, the solution is inexpensive as there is no need for change in hardware and retrospectively applied to existing devices. Further, the solution eliminates SIM switching and thereby further enhances user-experience.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood by those skilled in the art that the foregoing general description and the following detailed description are explanatory of the disclosure and are not intended to be restrictive thereof. Throughout the patent specification, a convention employed is that in the appended drawings, like numerals denote like components.

Reference throughout this specification to "an embodiment", "another embodiment" or similar language means that a particular feature, structure, or characteristic described in connection with the embodiment is included in at least one embodiment of the disclosure. Thus, the appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures proceeded by "comprises . . . a" does not, without more constraints, preclude the existence of other devices or other sub-systems.

Figure 1:
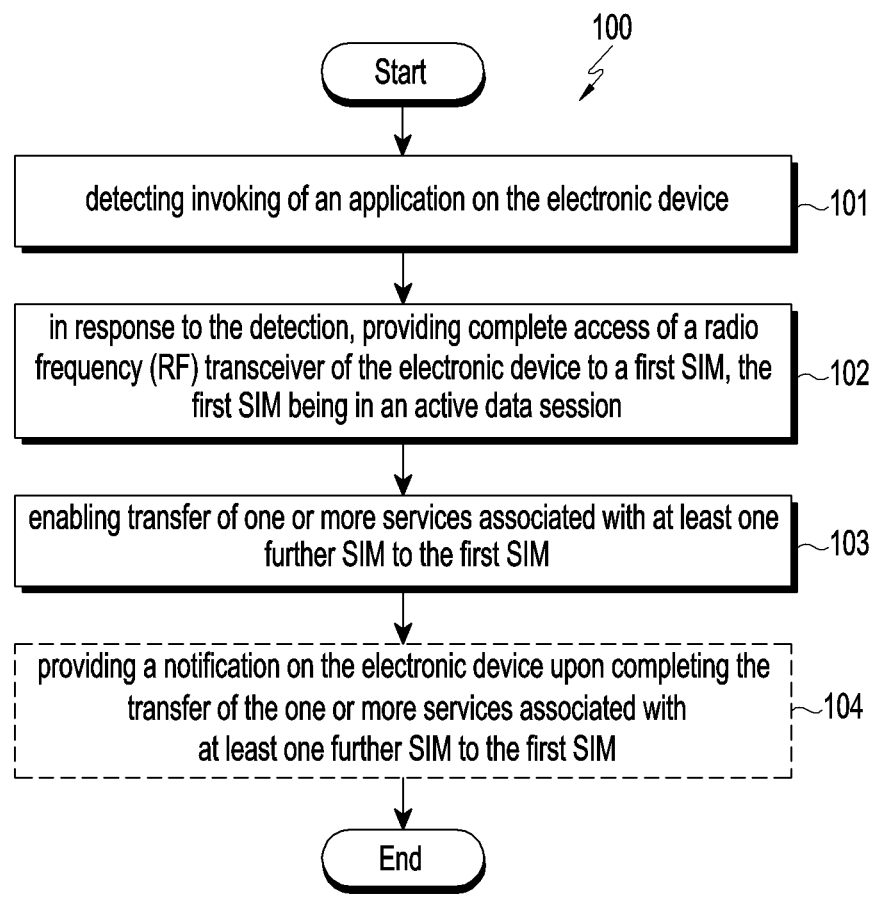
FIG. 1 illustrates a method for selectively transferring one or more services in multi-subscriber identity module (SIM)-multi-standby electronic device, according to an embodiment of the disclosure.

FIG. 1 illustrates a method for selectively transferring one or more services in multi-subscriber identity module (SIM)-multi-standby electronic device, according to an embodiment of the disclosure.

Referring to FIG. 1, at operation 101, invocation of an application on the electronic device is detected.

At operation 102, in response to the detection, complete access of a radio frequency (RF) transceiver of the electronic device is provided to a first SIM. The first SIM is in an active data session.

At operation 103, transfer of one or more services associated with one or more of remaining SIMs to the first SIM is enabled. The one or more services include incoming call and incoming text message.

Further, a method 100 comprises an operation of blocking a tuning-away of the RF transceiver from the at least one further SIM to the first SIM in response to enabling the transfer.

At operation 104, a notification is provided on the electronic device upon completing the transfer of the one or more services associated with at least one further SIM to the first SIM. The notification is indicative of the transfer of the one or more services thus completed.

Further, the operation 101 of detecting invocation of the application comprises further operations. The application is selected from a group comprising of an application configured to provide evolved multimedia broadcast multicast services (eMBMS) and one or more user-selected application installed on the electronic device.

Figure 2:
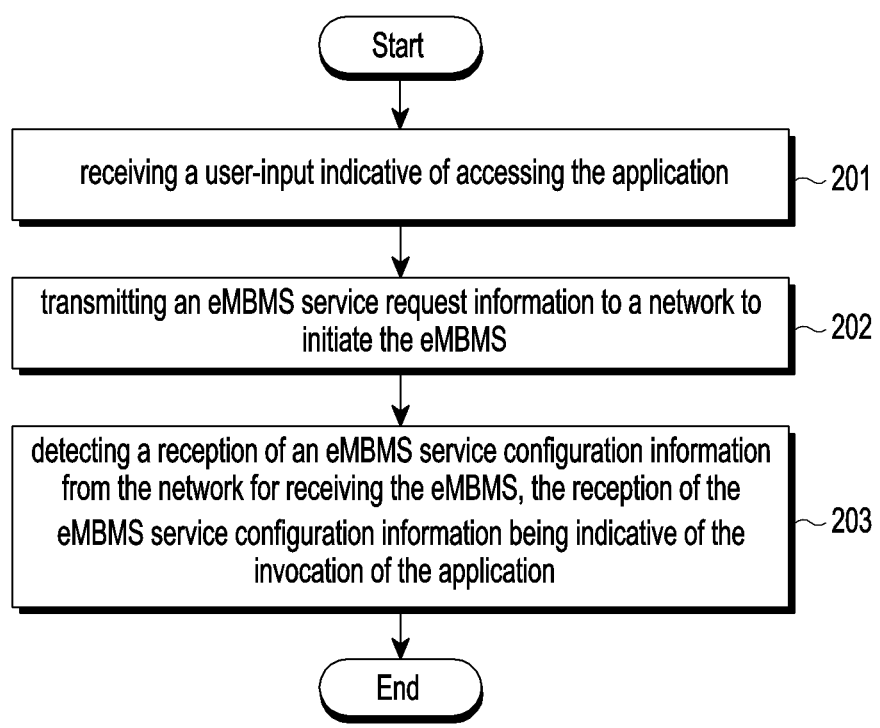
FIG. 2 illustrates a method for detecting invocation of application for selectively transferring one or more services in multi-SIM-multi-standby electronic device, as described in FIG. 1, according to an embodiment of the disclosure.

FIG. 2 illustrates a method for detecting invocation of application configured to provide eMBMS, according to an embodiment of the disclosure.

Referring to FIG. 2, at operation 201, a user-input indicative of accessing the application configured to provide eMBMS is received.

At operation 202, an eMBMS service request information is transmitted to a network to initiate the eMBMS.

At operation 203, a reception of an eMBMS service configuration information from the network for receiving the eMBMS is received. The reception of the eMBMS service configuration information is indicative of the invocation of the application and thereby enabling detection of the application.

Further, the detection of one or more user-selected applications installed on the electronic device comprises operations including receiving a user-input indicative of accessing the user-selected application, and determining the user-selected application is falling under one or more predefined categories to detect the invocation of the application.

Further, the operation 103 of enabling the transfer comprises further operations including, sending a request to a network associated with each of the at least one further SIM to transfer the one or more services to a network associated with the first SIM, and sending a further request to the network associated with each of the at least one further SIM to terminate transmission of paging channel information to each of the at least one further SIM.

Further, in one implementation, the operation 103 of enabling the transfer comprises automatically enabling the transfer for the at least one further SIM upon providing the complete access. In another implementation, the operation 103 of enabling the transfer comprises further operations including providing a notification on the electronic device upon providing the complete access, and requesting a user-input to enable the transfer for the at least one further SIM.

Further, the method 100 comprises operations of determining a termination of the application on the electronic device, providing access of the RF transceiver to the first SIM and the at least one further SIM, and disabling transfer of one or more services associated with the at least one further SIM to the first SIM.

Further, the method 100 comprises operations of permitting a tuning-away of the RF transceiver from the at least one further SIM and the first SIM in response to disabling the transfer.

Further, the method 100 comprises operations of sending a request to a network associated with each of the at least one further SIM to disable transfer the one or more services to a network associated with the first SIM, and sending a further request to the network associated with each of the at least one further SIM to initiate transmission of paging channel information to each of the at least one further SIM.

Figure 3:
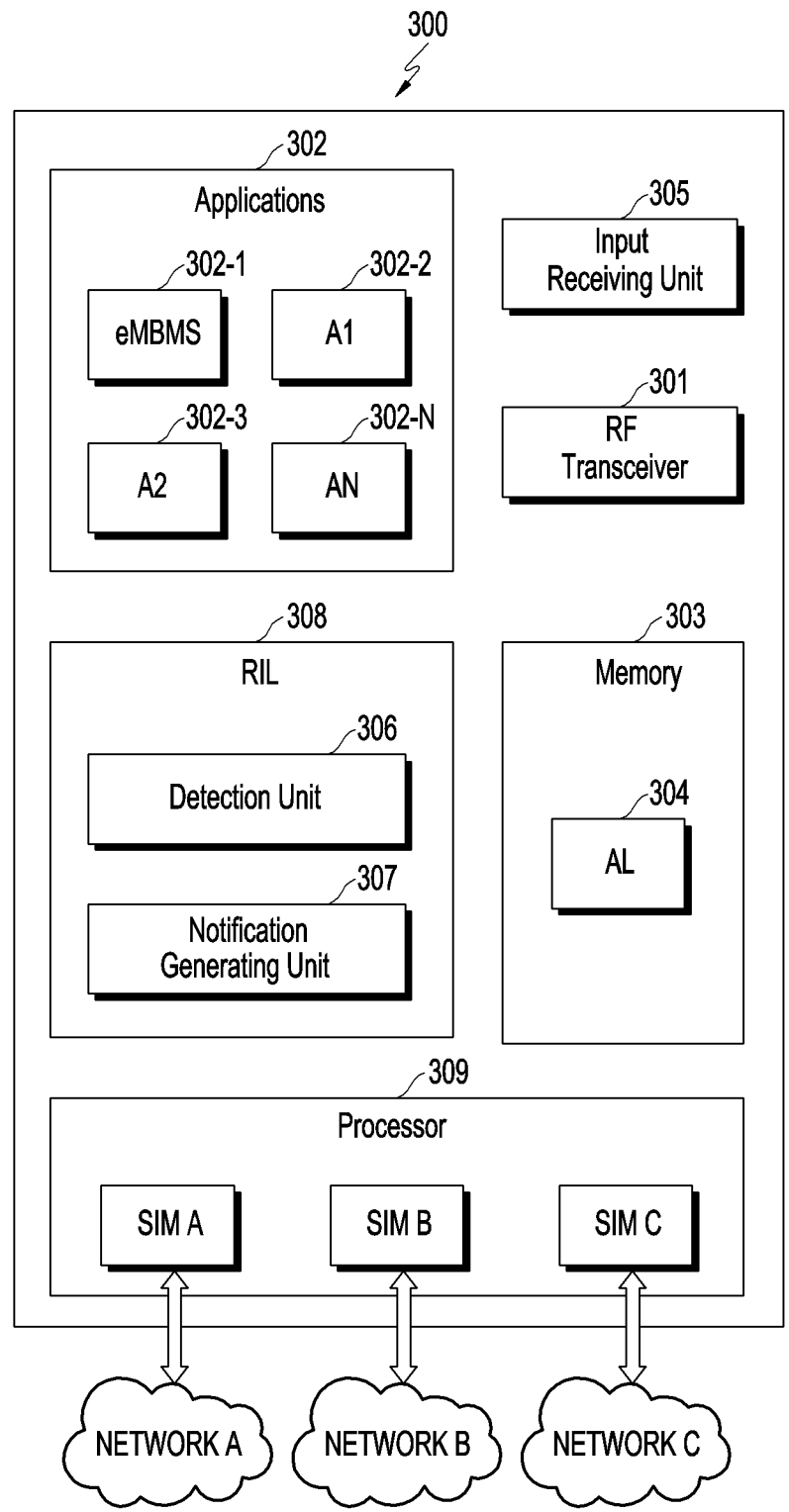
FIG. 3 illustrates a multi-SIM-multi-standby electronic device for selectively transferring one or more services according to an embodiment of the disclosure.

FIG. 3 illustrates a multi-SIM-multi-standby electronic device for selectively transferring one or more services according to an embodiment of the disclosure.

Referring to FIG. 3, a multi-SIM-multi-standby electronic device 300 (hereinafter referred to as electronic device 300 for sake of brevity) includes plurality of SIMs. Each of the SIMs is associated with a network. As would be understood, either all or some of the SIM can be associated with same network. For the sake of brevity, only three SIMs—SIM A, SIM B, and SIM C have been shown. SIM A is associated with network A, SIM B is associated with network B, and SIM C is associated with network C. The electronic device 300 operates on multi-standby mode and therefore has only one RF transceiver 301. Example of the electronic device 300 include, but not limited to, mobile devices, such as smart phone, tablet, tab-phones, and personal digital assistants (PDA).

The electronic device 300 includes various applications 302. The applications 302 includes application configured provide eMBMS (represented as eMBMS 302-1) and one or more user applications (represented as A1 302-2, A2 302-3, . . . AN 302-N) installed on the electronic device 300. Examples of the user applications include, but not limited to, chatting application, social media application, financial application, multimedia streaming application, navigation application, multimedia calling applications, etc. In accordance with the disclosure, a user can select one or more of such applications for selectively transferring one or more services while accessing the selected application(s). The user can select the application(s) in a manner, as known in the art. In an example, the user can select the applications from a settings page. Upon selection of the application(s), the details of the selected application(s) are stored in a memory 303 as application list (AL) 304.

Further, the electronic device 300 includes an input receiving unit 305, a detection unit 306, a notification generating unit 307, and a processor 309. The detection unit 306 and the notification generating unit 307 are implemented in a radio interface layer (RIL) 308. The processor 309 can be a modem or a cellular processor.

In operation, a first SIM, such as SIM B, is in active data session. The input receiving unit 305 receives a user-input indicative of accessing the application that is able to receive or transfer data over the active data session. The user-input can be touch-input or an input from an input device, such as stylus. As such, the input receiving unit 305 can be touch-based display unit of the electronic device 300. If the invoked application is selected from a group comprising of an application configured to provide eMBMS and one or more user-selected applications installed on the electronic device 300 (as mentioned above), the operations of selectively transferring one or more services in accordance with the disclosure will be performed. On the contrary, if the invoked application is not from the aforementioned group, the operations will be performed in a manner as known in the art.

To this end, the detection unit 306 determines if the invoked application is an application configured to provide eMBMS, i.e., eMBMS 302-1. Accordingly, upon receiving the user-input, the detection unit 306 transmits an eMBMS service request information to a network to initiate the eMBMS via the RIL 308, in a manner as known in the art. The format of the eMBMS service request information is known in the art. Thereafter, the detection unit 306 detects a reception of eMBMS service configuration information from the network for receiving the eMBMS. The eMBMS service configuration information is indicative of initiation of receiving content via the eMBMS. The format of the eMBMS service configuration information is known in the art. In an example, the eMBMS service configuration information is EMBMS_STATUS_NOTI. Upon reception of the eMBMS service configuration information, the detection unit 306 determines the application, i.e., eMBMS 302-1 has been invoked.

However, upon non-receipt of the eMBMS service configuration information, the detection unit 306 determines if the invoked application is a user-selected application. Accordingly, the detection unit 306 determines if the user-selected application is falling under one or more predefined categories to detect the invocation of the application. The categorization of the applications is based on user-selection and type of application. In an implementation, application(s) in a first category includes application(s) identified in the AL 304. In an implementation, application(s) in a second category includes application(s) identified as one of online gaming application, multimedia streaming application, multimedia calling application, navigation application, and any such categorized application.

Accordingly, the detection unit 306 determines if the invoked application falls under the first category based on the AL 304. To this end, the detection unit 306 fetches the AL 304 stored in the memory 303 and determines the application is listed in the AL 304 using techniques as known in the art.

However, when the detection unit 306 determines the application does not fall under the first category, the detection unit 306 determines if the application falls under the second category. To this end, the detection unit 306 obtains a metadata of the application. The metadata of the application includes, but not limited to, name of the application, type of the application, version of the application, date of installation, memory space occupied by the application, and memory space occupied by data exchanged via the application, etc. The type of application can be, but not limited to, online game, entertainment/streaming multimedia, e-commerce, lifestyle, multimedia calling, and finance. In an example, the metadata can be stored in the memory 303 during installation of the application. In such example, the detection unit 306 can obtain the metadata from the memory 303. In another example, the detection unit 306 can obtain the metadata from server(s) (not shown in the figure) hosting the application(s) over the active data session.

When the detection unit 306 determines the application does not fall under the second category, the operations will be performed in a manner as known in the art. However, when the detection unit 306 determines the invoked application is either the application configured to provide the eMBMS (eMBMS 302-1) or an application falling under the predefined categories, the operations of selectively transferring one or more services are performed. As such, the detection unit 306 transmits a message to the processor 309 upon detection. In an example, the message is having a format as setcallforward( ), as used for dynamic call functionality.

Accordingly, in response to detection, i.e., in response to reception of message, the processor 309 provides complete access of the RF transceiver 301 to the first SIM, i.e., SIM B. Thus, the first SIM will consume complete RF cycle for all services, such as incoming call, incoming message, paging channel information, etc., and data exchanged over the data session by the invoked application. Thereafter, the processor 309 enables transfer of one or more services associated with the at least one SIM to the first SIM, i.e., SIM B. The one or more services include incoming call and incoming text message. In an implementation, service(s) of only one SIM of the remaining SIMs is transferred. In an implementation, service(s) of few SIMs but not all of the remaining SIMs are transferred. As would be understood, in such implementations, the user will select SIM(s) for whom the service(s) will be transferred. SIM(s) whose services are not transferred would become non-reachable as known in the art. In an example, services(s) of only SIM A are transferred to SIM B and therefore SIM C will become non-reachable as known in the art. In another implementation, service(s) of all remaining SIMs are transferred. In an example, services(s) of both SIM A and SIM C are transferred to SIM B. For the sake of brevity and clarity, further operations will be described with respect to transferring service(s) of all remaining SIMs. The same operations will be followed for transferring any number of selected SIMs.

Accordingly, the processor 309 sends a request to the network associated with each of the remaining SIMs to transfer the one or more services to the network associated with the first SIM. In other words, the processor 309 sends a request to network A and network C to transfer services to network B. In an example, the request is having a format as SS_CALL_FORWARDING_WHEN_EMBMS and a value 0×29. This request may have the same format as the request message SS_CALL_FORWARDING_WHEN_BUSY used for call forwarding functionality, as known in the art. Upon receiving the message, the networks forward all the services related to the remaining SIMs to first SIM, in a manner as known in the art. As such, the network A will forward all incoming calls and messages for SIM A to network B. Similarly, the network C will forward all incoming calls and messages for SIM C to network B.

Thereafter, the processor 309 sends a further request to the network associated with each of the remaining SIMs to terminate transmission of paging channel information to each of the remaining SIMs. In an example, the request would be in message format as known in the art for enabling call forwarding functionality. Further, in response to enabling the transfer, the processor 309 blocks a tuning-away of the RF transceiver 301 from the remaining SIMs to the first SIM. The blocking of tuning-away can be performed using techniques as known in the art. This ensures that the RF transceiver 301 only listens to paging channel information from the first SIM, i.e., SIM B. Consequently, user-experience is greatly enhanced since the first SIM, i.e., SIM B, which is in active data session, is also able to receive call from SIM A and SIM C.

Figure 4:
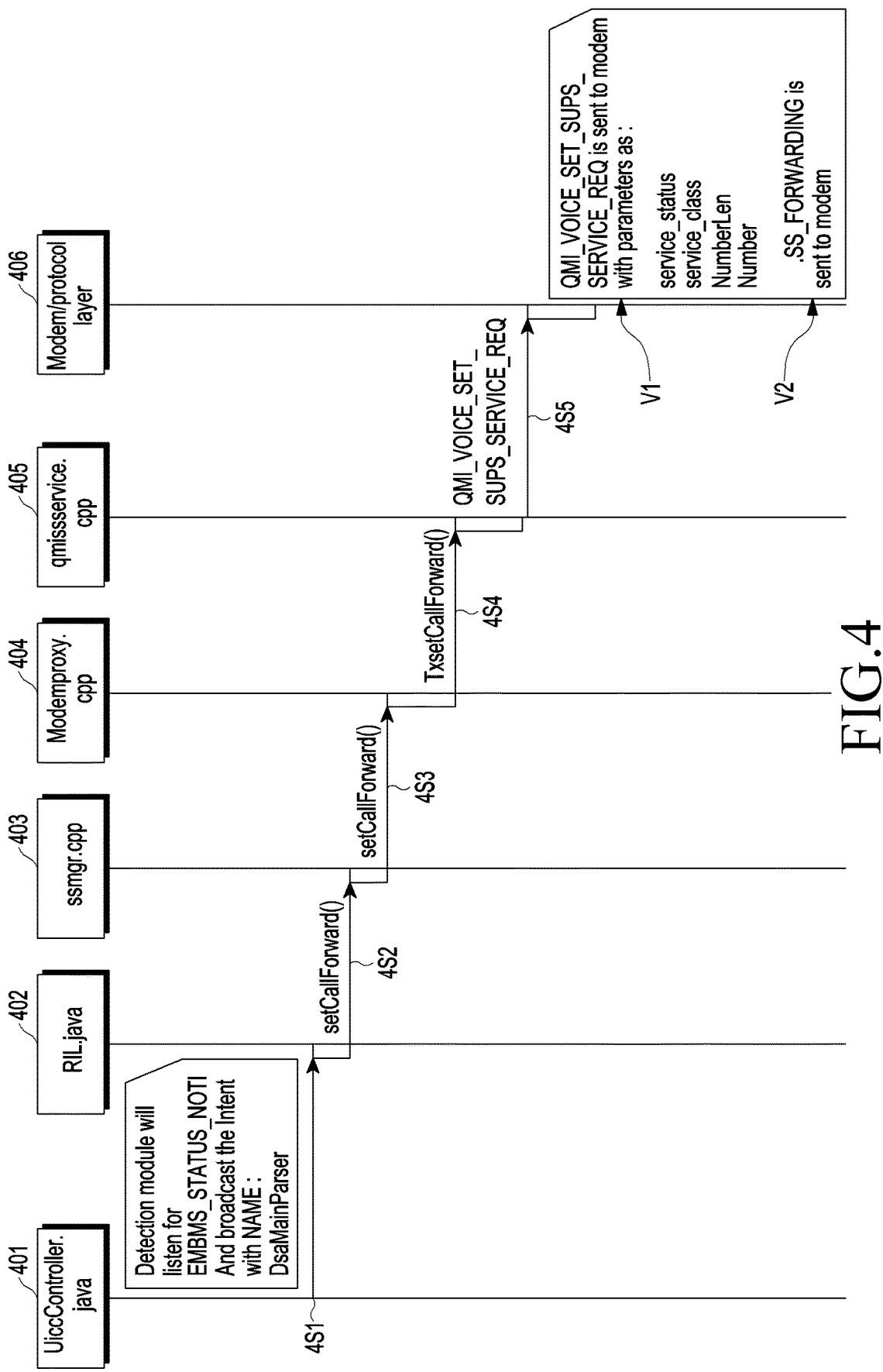
FIG. 4 depicts a sequence diagram depicting an implementation of a method as illustrated in FIGS. 1 and 2, according to an embodiment of the disclosure.

FIG. 4 depicts a sequence diagram illustrating a method implemented by a detecting unit and a processor for selectively transferring one or more services, according to an embodiment of the disclosure.

Referring to FIG. 4, accordingly, a detection unit 306 and a processor 309 communicate through with various modules that include plurality of policies/rules for controlling access to the networks, i.e., network A, network B, and network C. In accordance with the disclosure, the modules include UiccController.java 401, RIL.java 402, ssmgr.cpp 403, Modemproxy.cpp 404, qmisservice.cpp 405, and modem/protocol layer 406 of the processor 309.

At operation 4S1, the detection unit 306 will listen for EMBMS_STATUS_NOTI, i.e., eMBMS service configuration information from the network A, as described earlier. Upon receiving the EMBMS_STATUS_NOTI, the UiccController.java 401 broadcasts the intent or sends a message DsaMAinParser to RIL.java 402. The message DsaMAinParser is indicative of initiating the dynamic call forwarding functionality.

At operation 4S2, the RIL.java 402 sends a message setCallForward( ) to ssmgr.cpp 403 upon receiving the message DsaMAinParser.

At operation 4S3, the ssmgr.cpp 403 sends a message setCallForward( ) to the Modemproxy.cpp 404 upon receiving the message setCallForward( ).

At operation 4S4, the Modemproxy.cpp 404 sends a message TxsetCallForward( ) to the qmisservice.cpp 405 upon receiving the message setCallForward( ).

At operation 4S5, the qmisservice.cpp 405 sends a message to the modem/protocol layer 406. Different messages format can be used for chipsets or processors from different vendors. In an example, for electronic devices having chipset from a one vendor V1, the message QMI_VOICE_SET_SUPS_SERVICE_REQ with parameters as service status, service class, number length, and number are transmitted as known in the art. In another example, for electronic devices having chipset from another vendor V2, the message SS_FORWARDING without any parameters is transmitted, as described earlier.

Now, referring to FIG. 3, in one implementation, the processor 309 automatically enables the transfer for the remaining SIMs upon providing the complete access. To this end, the user can set an automatic option via a user-interface. In an example, the user-interface corresponds to a settings page available on the electronic device 300.

Figure 5A:
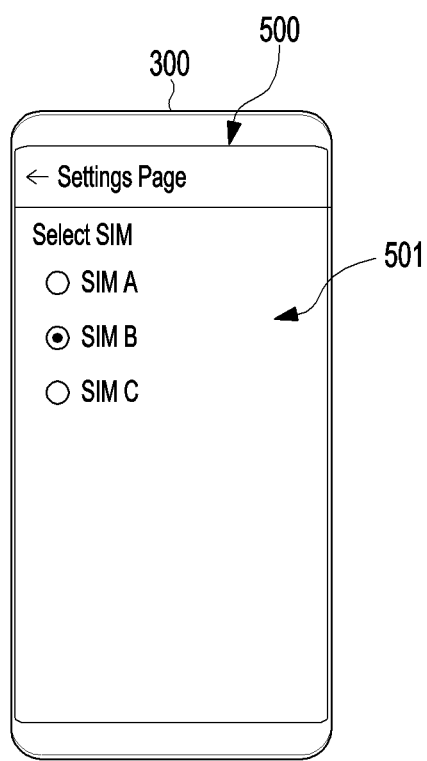
FIGS. 5A and 5B illustrate manifestations for automatically enabling transfer of one or more services, according to an embodiment of the disclosure.
Figure 5B:
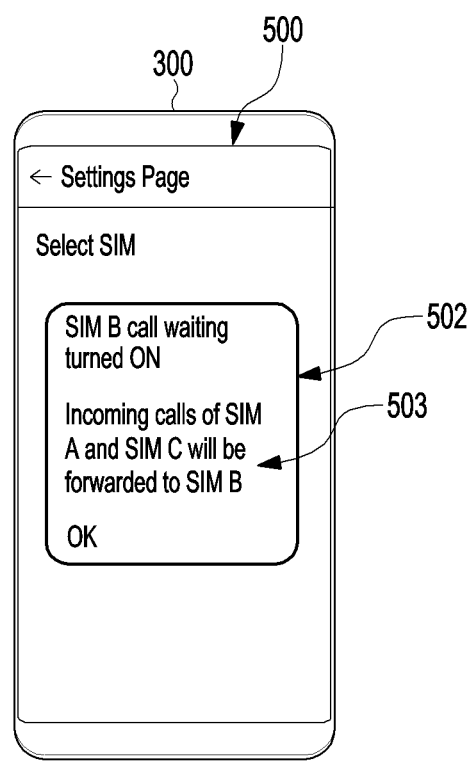

FIGS. 5A and 5B illustrate manifestations for automatically enabling transfer of one or more services according to an embodiment of the disclosure.

Referring to FIG. 5A, a user-interface 500 is displayed on the electronic device 300. The user-interface 500 corresponds to a settings page to select the SIM for automatically enabling the transfer. The user-interface 500 can be accessed in a manner as known in the art. The user-interface 500 includes a plurality of options 501 for selecting one of the SIM, i.e., SIM A, SIM B, SIM C, for automatic enabling. The user can enable the option 501 for selecting SIM B (represented by tick mark) in a manner as known in the art. As described earlier, the SIM B is in active data session and hence the SIM B has been selected. It would be understood that only the SIM in active data session will be selected for automatic enabling. Referring to FIG. 5B, upon selecting the option 501, the processor 309 automatically enables the transfer for the remaining SIMs to SIM B and provides a notification 502 on the user-interface 500. The notification 502 includes a text message 503 indicating SIM B call waiting turned ON and incoming calls of SIM A and SIM C will be forwarded to SIM B when SIM A and SIM C are out of reach. Examples of the notification 502 include a flash message and a pop-up message. Thus, upon setting the option 501 and in response to detection of invocation of application from the aforementioned group at later time, the processor 309 automatically enables transfer of services from SIM A and SIM C to SIM B, as described earlier.

Further, in one implementation, the processor 309 requests for a user-input prior to enabling the transfer of one or more services. To this end, the notification generating unit 307 provides a notification on the electronic device 300 upon providing the complete access and requests a user-input to enable the transfer for the remaining SIMs.

Figure 6A:
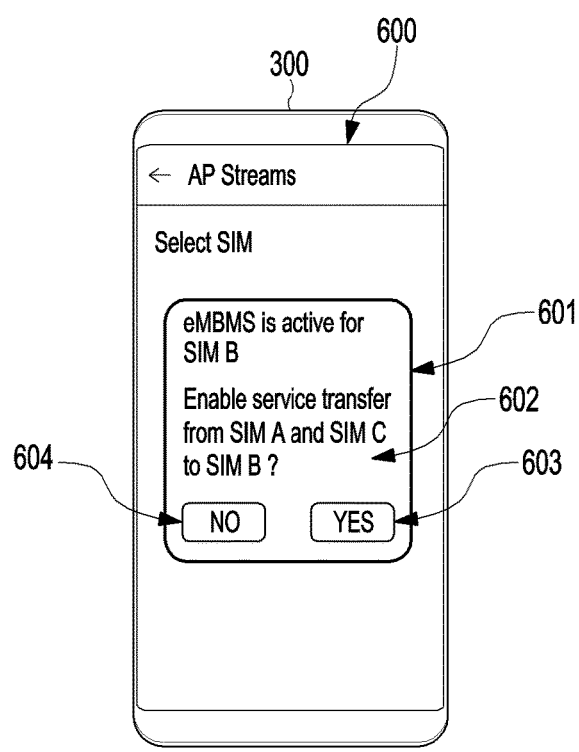
FIGS. 6A and 6B illustrate manifestations for enabling transfer of one or more services upon receiving user-input, according to an embodiment of the disclosure.
Figure 6B:
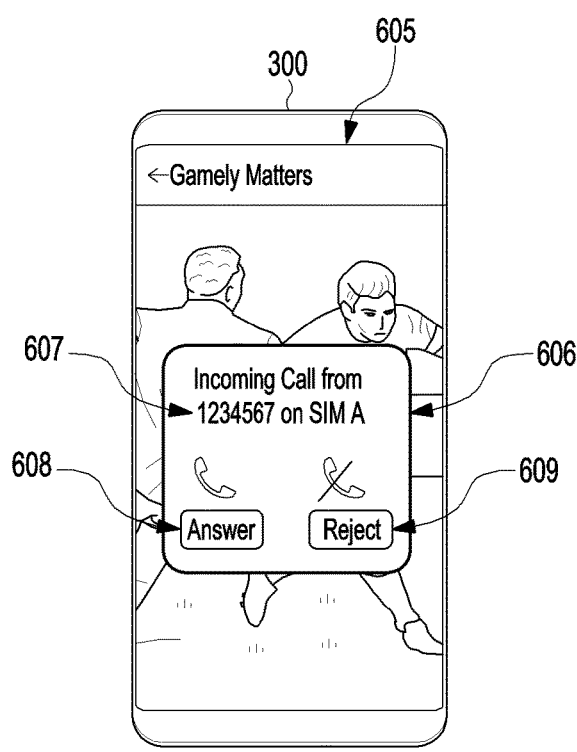

FIGS. 6A and 6B illustrate manifestations for enabling transfer of one or more services upon receiving user-input according to an embodiment of the disclosure.

Referring to FIG. 6A, a first user-interface 600 is displayed on the electronic device 300. The user-interface 600 corresponds to an access page (represented as AP Streams) of the application configured to provide eMBMS, i.e., eMBMS 302-1. This access page is displayed after receiving the user-input to invoke the eMBMS 302-1 in a manner as known in the art. Upon providing complete access of the RF transceiver 301 to first SIM, i.e., SIM B, the notification generating unit 307 provides a notification 601. Examples of the notification 601 include a flash message and a pop-up message. The notification 601 includes a text message 602 indicating eMBMS is active for SIM B and calls will not be available for SIM A and SIM C. The notification 601 further includes user-task 603 for enabling transfer of services and user-task 604 for preventing transfer of services.

Upon receiving the user-input corresponding to user-task 603, the processor 309 enables transfer of services to SIM B, as described earlier. Consequently, incoming calls to SIM A and SIM C will be forwarded to SIM B. In one implementation, the user may select the SIM (to whom the services will be transferred) via a user-interface as described in reference to FIGS. 5A and 5B. In an example, the user-interface 500 may be displayed after receiving the user-input corresponding to user-task 603. In another implementation, the user may one or more SIMs can be selected for whom the service(s) are to be transferred via a user-interface (not shown in the figure). The user-interface may display a list of all the SIMs in the electronic device 300, in a manner as described in reference to FIGS. 5A and 5B. In an example, only SIM A is selected and as such services(s) of SIM A are transferred to SIM B and therefore SIM C will become non-reachable as known in the art.

Referring to FIG. 6B, a second user-interface 605 (represented as Gamely Matters) is displayed on the electronic device 300 upon completion of the transfer. The second user-interface 605 displays content broadcasted by the eMBMS. An incoming call to SIM A is forwarded to SIM B while the content is being displayed on the second user-interface 605. As such, the notification generating unit 307 provides a notification 606 to indicate the incoming call. The notification 606 includes a text message 607 indicating incoming call for SIM A and user-tasks 608 and 609 for accepting or rejecting the incoming call. On the contrary, upon receiving the user-input corresponding to user-task 604, the processor 309 does not enable the transfer of services to SIM B. Consequently, incoming calls to SIM A and SIM C will not be forwarded to SIM B.

Further, in one implementation, upon completing the transfer of the one or more services associated with the remaining SIMs to the first SIM, the notification generating unit 307 provides a notification on the electronic device 300. The notification is indicative of the completed transfer of the one or more services.

Figure 7A:
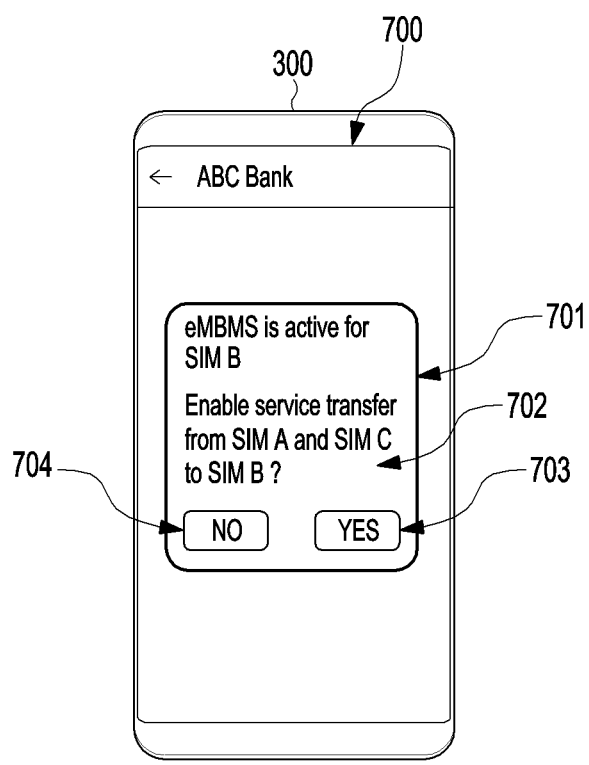
FIGS. 7A and 7B illustrate manifestations depicting completion of transfer of one or more services, according to an embodiment of the disclosure.
Figure 7B:
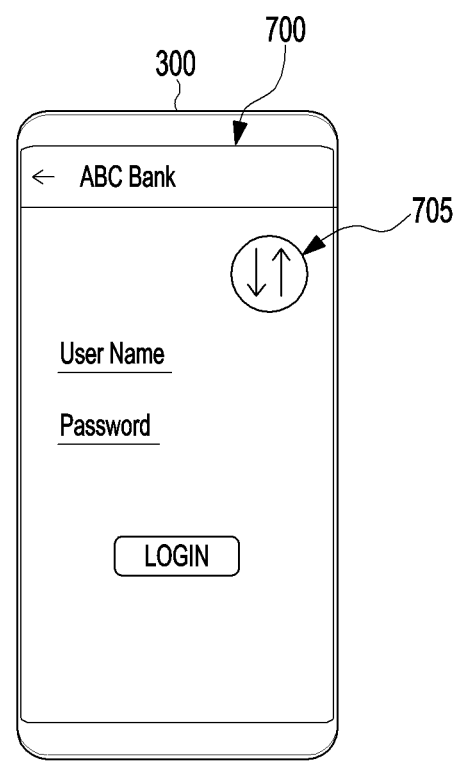

FIGS. 7A and 7B illustrate manifestations depicting completion of transfer of one or more services according to an embodiment of the disclosure.

Referring to FIG. 7A, a user-interface 700 on the electronic device 300 corresponds to an access page of a financial application, such as banking application of bank ABC. This access page is displayed after receiving the user-input to invoke the banking application of bank ABC, as described earlier. Upon providing complete access of the RF transceiver 301 to first SIM, i.e., SIM B, the notification generating unit 307 provides a notification 701, similar to notification 601 described in reference to FIGS. 6A and 6B above. The notification 701 includes text message 702, user-task 703 for enabling transfer of services, and user-task 704 for preventing transfer of services. Upon receiving the user-input corresponding to user-task 703, the processor 309 enables transfer of services to SIM B, as described earlier. Upon completing the transfer, referring to FIG. 7B, the notification generating unit 307 provides a notification 705 indicating completion of transfer. In an example, the notification 705 is in form of a floating icon placed on the user-interface 700. In another example, the notification 705 is in form of an icon placed in a notification panel. The notification 705 can be displayed even on home screen/lock screen until the application is terminated.

Further, in accordance with the disclosure, the transfers of service(s) are disabled upon termination of the invoked application. This enhances user-experience as the transfer of service(s) is event-based. Accordingly, the input receiving unit 305 receives a user-input indicative of terminating the application. In an example, the termination is provided by logging out of the application in a manner as known in the art. Based on the user-input, the detection unit 306 detects the termination of the application. In response to the detection, the processor 309 provides access of the RF transceiver to the first SIM and remaining SIMs. Thereafter, the processor 309 disables transfer of one or more services associated with the remaining SIMs to the first SIM. To this end, the processor 309 sends a request to the network associated with the remaining SIMs to disable transfer the one or more services to the network associated with the first SIM. In other words, the processor 309 sends a request to network A and network C to stop transferring the services to network B. In an example, the request would be in message format as known in the art for disabling call forwarding functionality.

Thereafter, the processor 309 sends a further request to the network associated with each of the remaining SIMs to initiate transmission of paging channel information to each of the remaining SIMs. Further, in response to disabling the transfer, the processor 309 permits a tuning-away of the RF transceiver 301 from the remaining SIMs. This enables the RF transceiver to listen to paging channel information from all the SIMs, i.e., from SIM A, SIM B, and SIM C. In an example, the request would be in message format as known in the art for disabling call forwarding functionality. The unblocking of or permitting tuning-away can be performed using techniques as known in the art.

Further, the processor 309 may also perform necessary functions of the electronic device 300, as known in the art. In one implementation, the functionalities of the detection unit 306, the notification generation unit 307, and the processor 309 as described earlier may be implemented by way of updating a framework of the electronic device 300. In one implementation, the units including the processor 309 as described earlier can be implemented as a software module, such as mobile-based application. The application can be pre-loaded or can be downloaded onto the electronic device 300. In one implementation, the functionalities of the units including the processor 309 as described earlier can be implemented as a module that is a combination of software and hardware modules. Although specific units have been illustrated in the figure and described above, it should be understood that the electronic device 300 may include other hardware modules or software module or combinations as may be required for performing various functions.

The advantages of the disclosure include, but are not limited to the following advantages. First of all, users will be able to enjoy eMBMS while simultaneously being able to receive calls on all SIMs. User interfaces are used for call forward activation to ease out user experience due to ease of using the user-interfaces. The disclosure can be implemented in all the existing eMBMS enabled models in market and the devices with required hardware capability by updating a framework of the devices, thereby reducing the overall cost.

Figure 8:
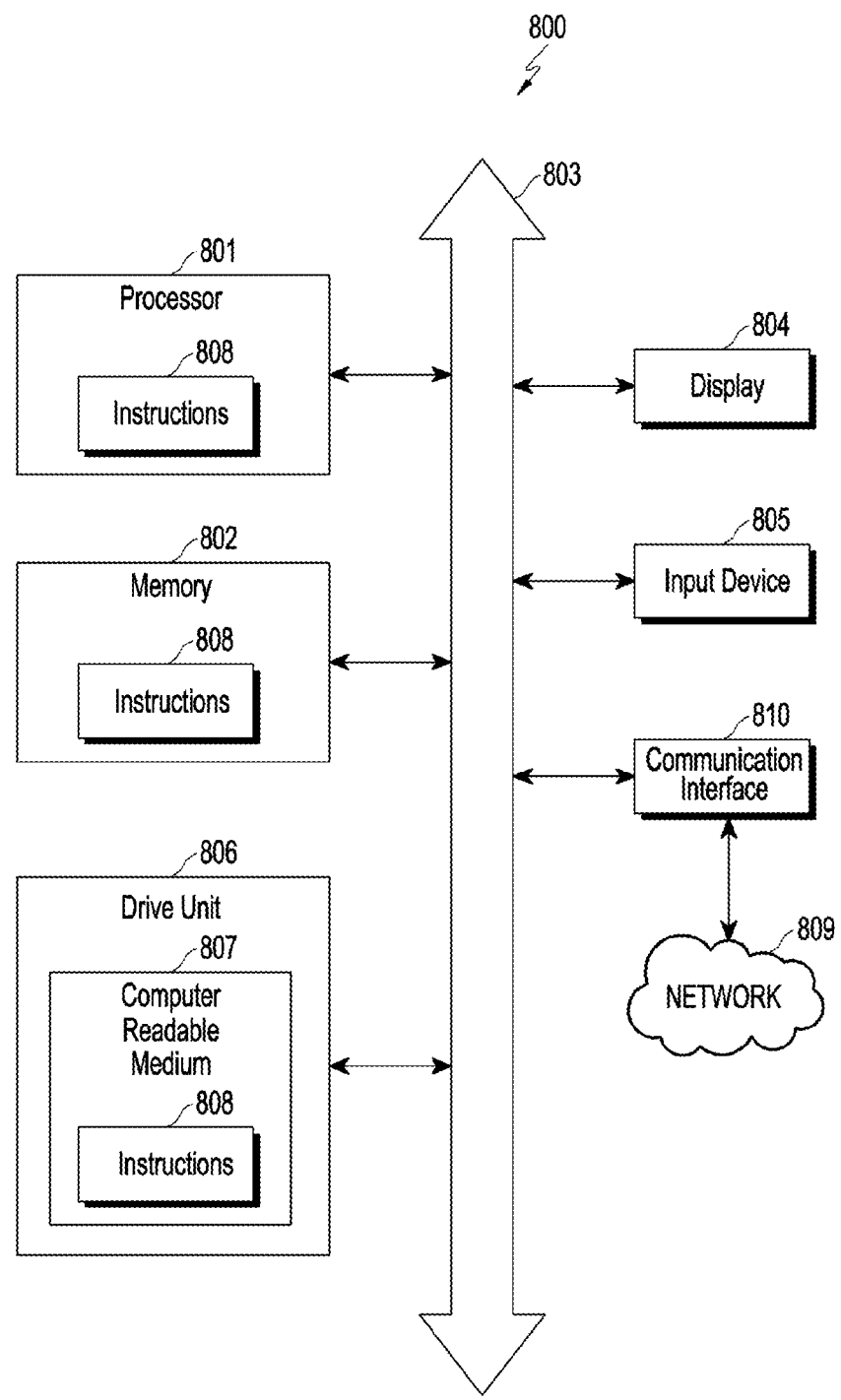
FIG. 8 illustrates a typical hardware configuration of an electronic device, according to an embodiment of the disclosure.

FIG. 8 illustrates a typical hardware configuration of an electronic device in the form of a computer system according to an embodiment of the disclosure.

Referring to FIG. 8, a computer system 800 can include a set of instructions that can be executed to cause the computer system 800 to perform any one or more of the methods disclosed. The computer system 800 may operate as a standalone device or may be connected, e.g., using a network, to other computer systems or peripheral devices.

In a networked deployment, the computer system 800 may operate in the capacity of a server or as a client user computer in a server-client user network environment or master-slave network environment, or as a peer computer system in a peer-to-peer (or distributed) network environment. The computer system 800 can also be implemented as or incorporated into various devices, such as a personal computer (PC), a tablet PC, a set-top box (STB), a PDA, a mobile device, a palmtop computer, a laptop computer, a desktop computer, or any other machine capable of executing a set of instructions (sequential or otherwise) that specify actions to be taken by that machine. Further, while the single computer system 800 is illustrated, the term "device" shall also be taken to include any collection of systems or sub-systems that individually or jointly execute a set, or multiple sets, of instructions to perform one or more computer functions.

The computer system 800 may include a processor 801, e.g., a central processing unit (CPU), a graphics processing unit (GPU), or both, such as the processor 309. The processor 801 may be a component in a variety of systems. For example, the processor 801 may be part of a standard PC or a workstation. The processor 801 may be one or more general processors, digital signal processors, application specific integrated circuits, field programmable gate arrays, servers, networks, digital circuits, analog circuits, combinations thereof, or other now known or later developed devices for analyzing and processing data. The processor 801 may implement a software program, such as code generated manually (i.e., programmed).

The computer system 800 may include a memory 802, such as the memory 303, that can communicate via a bus 803. The memory 802 may be a main memory, a static memory, or a dynamic memory. The memory 802 may include, but is not limited to computer readable storage media, such as various types of volatile and non-volatile storage media, including but not limited to random-access memory, read-only memory, programmable read-only memory, electrically programmable read-only memory, electrically erasable read-only memory, flash memory, magnetic tape or disk, optical media and the like. In one example, the memory 802 includes a cache or random access memory for the processor 801. In alternative examples, the memory 802 is separate from the processor 801, such as a cache memory of a processor, the system memory, or other memory. The memory 802 may be an external storage device or database for storing data. Examples include a hard drive, compact disc (CD), digital video disc (DVD), memory card, memory stick, floppy disc, universal serial bus (USB) memory device, or any other device operative to store data. The memory 802 is operable to store instructions executable by the processor 801. The functions, acts or tasks illustrated in the figures or described may be performed by the programmed processor 801 executing the instructions stored in the memory 802. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 800 may further include a display unit 804, such as a liquid crystal display (LCD), an organic light emitting diode (OLED), a flat panel display, a solid-state display, a cathode ray tube (CRT), a projector, a printer or other now known or later developed display device for outputting determined information. The display unit 804 may act as an interface for the user to see the functioning of the processor 801, or specifically as an interface with the software stored in the memory 802 or in a drive unit 806.

The computer system 800 may also include a disk or optical drive unit 806. The disk drive unit 806 may include a computer-readable medium 807 in which one or more sets of instructions 808, e.g. software, can be embedded. Further, the instructions 808 may embody one or more of the methods or logic as described. In a particular example, the instructions 808 may reside completely, or at least partially, within the memory 802 or within the processor 801 during execution by the computer system 800. The processor 801 and the memory 802 may also include computer-readable media as discussed above.

The disclosure contemplates a computer-readable medium that includes instructions 808 or receives and executes instructions 808 responsive to a propagated signal so that a device connected to a network 809 can communicate voice, video, audio, images or any other data over the network 809. Further, the instructions 808 may be transmitted or received over the network 809 via a communication port or interface 810 or using the bus 803. The communication port or interface 810 may be a part of the processor 801 or may be a separate component. The communication port or interface 810 may be created in software or may be a physical connection in hardware. The communication port or interface 810 may be configured to connect with the network 809, external media, the display unit 804, or any other components in computer system 800, or combinations thereof. The connection with the network 809 may be a physical connection, such as a wired Ethernet connection or may be established wirelessly as discussed later. Likewise, the additional connections with other components of the computer system 800 may be physical connections or may be established wirelessly. The network 809 may alternatively be directly connected to the bus 803.

The network 809 may include wired networks, wireless networks, Ethernet audio video bridging (AVB) networks, or combinations thereof. The wireless network may be a cellular telephone network, an 802.11, 802.16, 802.20, 802.1Q or Wi Max network. Further, the network 809 may be a public network, such as the Internet, a private network, such as an intranet, or combinations thereof, and may utilize a variety of networking protocols now available or later developed including, but not limited to transmission control protocol (TCP)/internet protocol (IP) based networking protocols.

Additionally, the computer system 800 may include an input device 805 configured to allow a user to interact with any of the components of computer system 800. The input device 805 may be a number pad, a keyboard, or a cursor control device, such as a mouse, or a joystick, touch screen display, remote control or any other device operative to interact with the computer system 800.

In an alternative example, dedicated hardware implementations, such as application specific integrated circuits, programmable logic arrays and other hardware devices, can be constructed to implement various parts of the computer system 800. Applications that may include the systems can broadly include a variety of electronic and computer systems. One or more examples described may implement functions using two or more specific interconnected hardware modules or devices with related control and data signals that can be communicated between and through the modules, or as portions of an application-specific integrated circuit. Accordingly, the present system encompasses software, firmware, and hardware implementations.

The system described may be implemented by software programs executable by a computer system. Further, in a non-limited example, implementations can include distributed processing, component/object distributed processing, and parallel processing. Alternatively, virtual computer system processing can be constructed to implement various parts of the system.

The system is not limited to operation with any particular standards and protocols. For example, standards for Internet and other packet switched network transmission (e.g., TCP/IP, user data protocol (UDP)/IP, (HTML), HTTP) may be used. Such standards are periodically superseded by faster or more efficient equivalents having essentially the same functions. Accordingly, replacement standards and protocols having the same or similar functions as those disclosed are considered equivalents thereof. It may be noted that the method as described in the disclosure can be implemented in a wide variety of electronic devices including but not limited to desktop computers, lap top computers, palm top computers, tabs, mobile phones, televisions, etc. In addition, the user input can be received by the system using a wide variety of techniques including but not limited to using a mouse, a gesture input, a touch input, a stylus input, a joy stick input, a pointer input, etc.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for transferring at least one service in a device, the method comprising:
   detecting invocation of an application on the device;
   when the invocation of the application is detected, providing access of a radio frequency (RF) transceiver of the device to a first subscriber identity module (SIM) that is in an active data session;
   while the first SIM is in the active data session and at least one second SIM is in an inactive data session, providing a user interface including a user task for requesting to enable transfer of at least one service associated with the at least one second SIM to the first SIM;
   in response to receiving a user input corresponding to the user task for requesting to enable the transfer of the at least one service on the user interface, transferring the at least one service from the at least one second SIM to the first SIM; and
   continuing the at least one service using the RF transceiver and the first SIM.

2. The method of claim 1,
   wherein the at least one service includes an incoming call or incoming text message,
   wherein, when the application is configured to provide evolved multimedia broadcast multicast services (eMBMS), the detecting comprises:

receiving a user input indicative of accessing the application;

transmitting eMBMS service request information to a network to initiate the eMBMS; and detecting a reception of an eMBMS service configuration information from the network for receiving the eMBMS, the reception of the eMBMS service configuration information being indicative of the invocation of the application, and wherein, when the application is selected by a user input, the detecting comprises:

when the application corresponds to one or more predefined categories, detecting invocation of the application; and receiving a user input indicative of accessing the application.

3. The method of claim 1, wherein the enabling of the transfer comprises:

sending a first request to a network associated with each of the at least one second SIM to transfer the at least one service to a network associated with the first SIM; and sending a second request to the network associated with each of the at least one second SIM to terminate transmission of paging channel information.

4. The method of claim 1, further comprising, in response to enabling the transfer, precluding the at least one second SIM from controlling tuning of the RF transceiver.

5. The method of claim 1, further comprising, upon completing the transfer of the at least one service associated with the at least one second SIM to the first SIM, providing a notification on the device to indicate that the transfer of the at least one service is completed.

6. The method of claim 1 further comprising:

determining a termination of the application on the device;

providing access of the RF transceiver to the first SIM and the at least one second SIM; and disabling transfer of the at least one service associated with the at least one second SIM to the first SIM.

7. The method of claim 6, further comprising, in response to the disabling of the transfer, permitting the at least one second SIM to control tuning of the RF transceiver.

8. The method of claim 6, wherein the disabling of the transfer further comprises:

sending a first request to a network associated with each of the at least one second SIM to disable transfer of the at least one service to a network associated with the first SIM; and sending a second request to the network associated with each of the at least one second SIM to initiate transmission of paging channel information to each of the at least one second SIM.

9. A device for transferring at least one service, the device comprising:

a radio frequency (RF) transceiver; and a processor configured to:

detect invocation of an application on the device, when the invocation of the application is detected, provide access of the RF transceiver to a first subscriber identity module (SIM) that is in an active data session, while the first SIM is in the active data session and at least one second SIM is in an inactive data session, provide a user interface including a user task for requesting to enable transfer of at least one service associated with the at least one second SIM to the first SIM, in response to receiving a user input corresponding to the user task for requesting to enable the transfer of the at least one service on the user interface, transfer the at least one service from the at least one second SIM to the first SIM, and continue the at least one service using the RF transceiver and the first SIM.

10. The device of claim 9, wherein the at least one service includes an incoming call or incoming text message, wherein, when the application is configured to provide evolved multimedia broadcast multicast services (eMBMS), the processor is further configured to:

receive a user input indicative of accessing the application, control the RF transceiver to transmit eMBMS service request information to a network to initiate the eMBMS, and detect a reception of an eMBMS service configuration information from the network for receiving the eMBMS, the reception of the eMBMS service configuration information being indicative of the invocation of the application, and wherein, when the application is selected by a user input, the processor is further configured to receive a user input indicative of accessing the application, and determine that the application corresponds to one or more predefined categories.

11. The device of claim 9, wherein the RF transceiver is further configured to:

send a first request to a network associated with each of the at least one second SIM to transfer the at least one service to a network associated with the first SIM, and send a second request to the network associated with each of the at least one second SIM to terminate transmission of paging channel information.

12. The device of claim 9, wherein, in response to enabling the transfer, the processor is further configured to preclude the at least one second SIM to control tuning of the RF transceiver.

13. The device of claim 9, wherein, upon completing the transfer of the at least one service associated with the at least one second SIM to the first SIM, the processor is further configured to provide a notification on the device to indicate that the transfer of the at least one service is completed.

14. The device of claim 9, wherein the processor is further configured to:

determine a termination of the application on the device, provide access of the RF transceiver to the first SIM and the at least one second SIM, and disable transfer of the at least one service associated with the at least one second SIM to the first SIM.

15. The device of claim 14, wherein, in response to enabling the transfer, the processor is further configured to permit the at least one second SIM to control tuning of the RF transceiver.

16. The device of claim 14, wherein the RF transceiver is further configured to:

send a first request to a network associated with each of the at least one second SIM to disable transfer of the at least one service to a network associated with the first SIM; and send a second request to the network associated with each of the at least one second SIM to initiate transmission of paging channel information to each of the at least one second SIM.

\* \* \* \* \*